United States Patent [19]

Goodman

[11] Patent Number: 5,301,253
[45] Date of Patent: Apr. 5, 1994

[54] GLASS FIBER WITH SOLDERABILITY ENHANCING HEAT ACTIVATED COATING

[75] Inventor: Sidney H. Goodman, Calabasas, Calif.

[73] Assignee: Hughes Aircarft Company, Los Angeles, Calif.

[21] Appl. No.: 973,348

[22] Filed: Nov. 9, 1992

[51] Int. Cl.$^5$ ............................................. G02B 6/22
[52] U.S. Cl. ................................. 385/128; 385/125; 428/392; 428/375; 428/379
[58] Field of Search ............... 428/392, 373, 375, 379, 428/388, 380, 381, 389; 219/78.02, 85.2, 85.21; 385/115, 123, 125, 126, 127, 128, 141, 144, 145

[56] References Cited

U.S. PATENT DOCUMENTS

| | | | |
|---|---|---|---|
| 4,407,561 | 10/1983 | Wysocki | 350/96.3 |
| 4,418,984 | 12/1983 | Wysocki et al. | 350/96.33 |
| 5,061,035 | 10/1991 | Rogers, Jr. | 385/115 |
| 5,145,722 | 9/1992 | Kaspaul | 427/388.1 |

FOREIGN PATENT DOCUMENTS

| | | |
|---|---|---|
| 0063580 | 1/1987 | European Pat. Off. |
| 1050444 | 12/1966 | United Kingdom |

OTHER PUBLICATIONS

M. Iverson, "Cellulose Acetate Butyrate", in *Eastman Chemicals*, Publication No. E-134F, pp. 1-4 (Jul. 1984).

*Primary Examiner*—Rodney B. Bovernick
*Assistant Examiner*—John Ngo
*Attorney, Agent, or Firm*—M. E. Lachman; M. W. Sales; W. K. Denson-Low

[57] ABSTRACT

A protective layer or film applied to the metal surface of metal-clad optical fibers or metal-clad glass capillaries protects the metal surface during storage and provides a suitable fluxing surface. The protective layer or film comprises a mixture of a dicarboxylic acid fluxing agent and a chosen protective material which is unreactive with the dicarboxylic acid and which forms a film with the dicarboxylic acid that alters at a chosen soldering temperature to release the dicarboxylic acid. Prior to soldering, the chosen protective material maintains the metallic layer in an oxide-free state and the protective layer protects the metallic layer from external contamination to thereby enhance the solderability of the metallic surface when exposed to the soldering temperature at which the fluxing agent is released.

8 Claims, No Drawings

GLASS FIBER WITH SOLDERABILITY ENHANCING HEAT ACTIVATED COATING

CROSS-REFERENCE TO RELATED PATENT

The present application is related to U.S. Pat. No. 5,145,722, issued September 8, 1992, which is directed to a method and composition for protecting and enhancing the solderability of metallic surfaces.

BACKGROUND OF THE INVENTION

1. Field of the Invention

The present invention relates generally to the soldering of metal-coated glass fibers. More specifically, the present invention relates to a coating or film which protects the metallic coating f rom oxidation and contamination during storage of metal-coated optical fibers and metal-coated glass capillaries and which provides at the same time for proper fluxing of the metal coating to enhance solderability at the solder temperature. 2. Description of Related Art Optical fibers, which comprise a glass core and a glass cladding to provide waveguiding of light, are coated with a metal or alloy in order to facilitate connections in electro-optic circuits and to other optical fibers and to provide increased strength and durability to the optical fiber.

The metal coating of the optical fibers is described in, for example, U.S. Pat. Nos. 4,407,561 and 4,418,984, both assigned to the same assignee as the present application. As disclosed in U.S. Pat. No. 4,407,561, the metal (or alloy) that is used is one that (a) is substantially chemically inert with respect to the material comprising the glass fiber at the melting point of the metal or alloy, (b) has a recrystallization temperature greater than room temperature or the contemplated working temperature, whichever is greater, and (c) forms a hermetic seal around the outer surface of the glass cladding. Examples of suitable metals include vanadium, chromium, iron, cobalt, nickel, copper, zirconium, niobium, and palladium. Other metals which have been used in the art to coat optical fibers are disclosed in U.S. Pat. No. 4,407,561 and include aluminum, antimony, bismuth, cadmium, silver, gold, zinc, lead, indium, tin, and their alloys. Optionally, a plastic coating may be provided on top of the metallic coating to provide added mechanical protection and electrical insulation.

U.S. Pat. No. 4,418,984 discloses the formation of at least two metallic coatings on the glass waveguide structure. The metallic coatings may be the same or different compositions.

The metal-coated optical fibers are connected to electro-optic circuits or to other optical fibers by soldering. The solder operation requires proper fluxing agents, for without them, reliable electrical and/or mechanical connection may not be made even on apparently clean surfaces. In particular, the presence of metal oxides on the surface to be soldered prevents adequate wetting of the surface with the solder and results in a poor bond. Such oxides are referred to as "interfering oxides" and are often difficult to remove.

Metal-coated optical fibers and circuit boards and components to which the metal-coated optical fibers are to be soldered, as received, are not necessarily clean and may carry various kinds of surface contaminants. Subsequent storage of metal-coated optical fibers is often done in an inert environment in order to prevent the surface from oxidizing. However, inert environment storage has been found to suffer from two disadvantages: (1) the cost of the inert gas used to provide the inert environment and of the sealed cabinets, and (2) the hazard of an oxygen-free environment to operators of the storage system.

Metal-coated glass capillaries are also known as described, for example, in European Pat. No. 0 063 580, granted Jan. 21, 1987, for "Metallic Clad Capillary Tubing" and assigned to the present assignee. Many of the metals and alloys listed above are used as the metal coating. The same considerations involved in soldering metal-coated optical fibers also apply for soldering metal-coated capillaries.

Thus, there is a need for a protective coating on the metal-coated glass fibers to protect the metal against oxidation during storage and to provide a suitable fluxing surface without the need for precleaning. As used herein, the term "metal-coated glass fibers" is intended to be generic to both metal-coated optical fibers and metal-coated glass capillaries.

SUMMARY OF THE INVENTION

In accordance with the invention, a surface coating or film is applied to the metal surface of metal-clad glass fibers in order to protect the surface against oxidation during storage and to provide a suitable fluxing surface without the need for precleaning. The surface coating or film comprises a mixture of a dicarboxylic acid fluxing agent and a chosen protective material which is unreactive with the dicarboxylic acid and which forms a film with the dicarboxylic acid that alters at a chosen soldering temperature to release the dicarboxylic acid. Prior to soldering, the chosen protective material maintains the metallic layer in an oxide-free state and the protective layer protects the metallic layer from external contamination to thereby enhance the solderability of the metallic surface when exposed to the soldering temperature at which the fluxing agent is released.

The glass fiber may comprise an optical fiber, comprising a core having a first refractive index and a clad surrounding the core and having a second refractive index. Alternatively, the glass fiber may comprise a capillary. In either case, the outer surface of the glass fiber is provided with a metallic coating, which is coated with the protective layer of the invention.

The protective layer or film is formed by providing the foregoing mixture and forming a film from the mixture on the metallic coating wherein the film provides protection of the metallic coating from contamination and against oxidation during storage prior to a soldering process, and, upon subsequent exposure to the chosen soldering temperature, releases the fluxing agent to thereby enhance the solderability of the metallic coating.

The mixture comprises a solution in which the protective material and dicarboxylic acid fluxing agent are dissolved in a suitable solvent. The solution may be applied in a variety of ways to the metal-coated optical fiber, such as by spraying the solution on the fiber, dipping the fiber in the solution, or otherwise passing the fiber through the solution.

The teachings of the invention (a) eliminate the need for the prior art environmental storage and (b) improve pretinning by providing a more solderable oxide-free surface and by supplying flux in the coating rather than by a separate application prior to tinning.

DESCRIPTION OF THE PREFERRED EMBODIMENTS

A novel glass fiber structure is formed which has a thermo-degradable/heat-activated coating that durably preserves and protects the solderability of the metallized optical fiber or capillary surface during storage and acts as a flux during the soldering operation. The coating comprises mixtures of protective materials and fluxing agents. The present invention has wide applicability to protecting and enhancing the solderability of a variety of metallic coatings on glass fibers.

The present invention is particularly well-suited for treating copper-clad optical fibers. However, the invention is also useful in treating other metal-clad optical fibers having a metal coating that must be joined to electro-optic circuits or to other metal-clad optical fibers, and is useful for treating glass capillaries (i.e., tubular structures).

The present invention may be used with a wide variety of solder types. Although lead and lead alloy solders are the preferred type of solder, the film produced in accordance with the present invention has use in treating metal-clad glass fibers prior to soldering wherein any of the other well-known solder materials are to be used.

The films or coatings of the present invention are applied as a mixture to the metallic surface. The mixture includes a protective material and a dicarboxylic fluxing agent.

The protective material is essentially unreactive with the dicarboxylic fluxing agent and the metallic surface to be soldered and is capable of forming, in the presence of the fluxing agent, the film which protects the metallic surface from contamination in accordance with the present invention. Further, the protective agent must alter its form when subjected to soldering temperatures, for example, between 500° and 700° F. (260° to 371° C.), in such a manner that the fluxing agent is released. Thus, the heat at the soldering temperature activates the film to release the fluxing agent which enhances the solderability of the metallic surface.

While not limiting the present invention to a particular theory of operation, it is believed that the protective material melts, although other forms of alteration may be possible. The particular protective material is chosen to be compatible with the particular dicarboxylic acid used and the particular soldering temperature used. Suitable protective materials include, but are not limited to, cellulose and derivatives of cellulose; vinyl polymers, particularly vinyl chloride copolymers alone or in combination with vinyl acetate or vinyl alcohol; acrylic copolymers; polyether glycols; and thermoplastic elastomers. Suitable cellulosic protective materials include cellulose; cellulose esters such as cellulose acetate, cellulose nitrate, cellulose acetate butyrate, cellulose acetate propionate, and the like; cellulose ethers such as ethyl cellulose, methyl cellulose, carboxy methyl cellulose, and the like; and other similar cellulose derivatives. Preferably, the cellulose is partially, but not totally, esterified. Since the protective material protects the surface to be soldered from contamination and oxidation, no presoldering cleaning step is required, and thus the use of undesirable chemicals is avoided.

The dicarboxylic acid fluxing agent must be a dicarboxylic acid or a derivative thereof. Suitable dicarboxylic acids include adipic acid, succinic acid, fumaric acid, maleic acid, glutaric acid, their alkyl derivatives, and their aromatic derivatives. It is advantageous to use such a dicarboxylic acid fluxing agent which, when exposed to soldering temperatures, forms volatile by-products which leave no residue on the metallic surface. Thus, in accordance with the present invention, no post-soldering cleaning step is required. This feature of the present invention is particularly significant, since such cleaning to remove rosin flux as practiced in the art typically uses chlorofluorocarbon materials, which have an undesirable environmental impact.

The exact ratio of fluxing agent to protective material will depend upon the particular application. Where it is desired to provide increased fluxing action or increase in the energy of low-energy surface sites, then the amount of fluxing agent should be increased. However, increases in the amount of fluxing agent tend to reduce the adherence of the film to the metallic surface. Accordingly, it is preferred to reduce the amount of fluxing agent to as low a level as possible to provide the desired enhancement of solderability while still insuring that adherence of the film or coating to the metallic surface is maximized. For a mixture comprising adipic acid and cellulose acetate butyrate, a preferred ratio by weight of the protective material to the fluxing agent has been found to be about 1:1.

The above-described mixture may be applied to the metallic surface in a number of different ways. Preferably, the protective material is dissolved in a suitable solvent. For a cellulose derivative, suitable solvents are acetone, methyl ethyl ketone, other ketone solvents, or tetrahydrofuran. The fluxing agent is likewise dissolved separately in an appropriate solvent, such as methanol, isopropanol, acetone, or tetrahydrofuran. The two resulting solutions are then combined to form a coating solution in which the required ratio range of protective material and fluxing agent is provided. Alternatively, the fluxing agent and protective material may be dissolved in predetermined amounts in a common solvent or solvent blend.

For example, adipic acid is dissolved in a solvent comprising isopropyl alcohol and acetone in a ratio of 40:60 to 60:40 isopropyl alcohol:acetone, and preferably 50:50. The concentration of the adipic acid in the solvent mixture is no more than about 20 percent by weight.

A preferred coating solution is made by dissolving the protective material in a suitable solvent to form a protective material solution, and dissolving the dicarboxylic acid in a suitable solvent to provide a fluxing agent solution. These two solutions are then mixed together in equal proportions to form the final mixture which is preferably stored at room temperature for several hours, typically about twenty-four hours, prior to use. This storage time may be reduced if the storage temperature is raised slightly. However, it is preferred to store the mixture at room temperature to allow complete mixture of the solutions. The mixture may be diluted as required with an appropriate solvent or solvent blend in order to obtain the desired viscosity for applying the mixture, such as by dipping the substrate containing the metallic surface into the solution, to form a good quality coating.

After the setting period, the solution can be applied to the metallic surface by spraying or brushing, or the surface can be dipped into the solution. In a dipping process, the structure supporting the metallic surface, as well as the metallic surface itself becomes coated. Silk-screening of the solution onto the surface is also possible. The solution is quick drying and results in a tough and well-adherent thin film. The solution has an indefinite shelf life and one sample has been stored for over a year and a half without loss in effectiveness.

In order to increase the adherence of the film to the metallic surface, it was discovered that heating of the film to temperatures between 120° and 150° C. resulted in a more adherent film having an improved appearance. Other methods for achieving this improved adherence and appearance of the film include hot spraying of the solution at temperatures between 120° and 150° C. and/or preheating of the metallic surface within this temperature range.

The thickness of the coating formed in accordance with the present invention depends on the particular fluxing agent and protective material used and their relative proportions in the coating solution, as well as on the particular method used to apply the coating and the particular solder reflow technique used. The coating must be of sufficient thickness to provide an adequate amount of adipic acid (or other dicarboxylic acid fluxing agent) to be released at soldering temperatures so that solderability is enhanced. In addition, the coating must be sufficiently thick to provide a barrier to contamination. On the other hand, if the coating is too thick, the protective material may char or produce contamination when subjected to soldering temperatures. The preferred thickness may be readily determined by experimentation. For the embodiment of the present invention described in the example herein, the preferred thickness was within the range of about 0.4 to 1.2 mils (0.001 to 0.003 cm).

Another method for preparing the mixture which is to be applied to the metallic surface involves melting the protective material and fluxing agent in the appropriate weight ratios to form a liquid having the appropriate composition. The liquid is cooled and the resulting solid is dissolved in a suitable solvent, such as acetone or methyl ethyl ketone. The resulting solution is then allowed to set for several hours at room temperature prior to application to the metallic substrate by any of the methods previously mentioned. The concentration of the protective material and fluxing agent in the solvent can be varied widely depending on the method of application used, such as spraying, brushing, dipping, etc. Preferably, the combined concentration of the protective material and fluxing agent in the solvent should be below about seventy percent. Higher concentrations result in the solution becoming exceedingly viscous and difficult to apply evenly in thin coatings.

The coating of the present invention is preferably applied to the metallic surface as soon as possible after the metallic surface is formed, in order to avoid any possible contamination of the surface.

If desired, the coating can be softened after application by subjecting it to a suitable solvent such as a halocarbon or a ketone such as acetone. The softened coating is tacky and is especially useful in fabricating electronic circuit boards where it is desired to stick the fiber onto the board prior to soldering. The film should be treated with the additional solvents for only as long as it takes to make the surface softened and tacky. Unduly long exposure of the film to solvents may deteriorate the film.

The protective layer provided in accordance with the teachings of the present invention will maintain solderability of a metallized optical fiber or capillary surface so that restoration of solderability by use of chemical and mechanical treatments can be precluded.

The advantages provided by the protective layer of the present invention are:
a. Protection against oxidation. During storage, the dicarboxylic acid serves as a pro-active flux to maintain the metal surface in an oxide-free state, which provides a clean surface for forming an improved solder connection.
b. Protection against contamination. The coating protects the bare metal surface during storage against contamination from the environment.
c. No additional solder flux required. The coating acts as a flux during the soldering operation.
d. No solder coating during storage. Because the structure does not have to be solder-coated to maintain solderability during storage, harmful intermetallics which degrade solderability cannot form prior to actual preparation for component use.
e. Fewer operational steps and expenditures.
f. No post-solder cleaning. The use of restricted solvents is avoided.

The structure provided by the teachings of the present invention should reduce the cost of soldering both optical fibers and cables made therefrom and glass capillaries by providing a surface that is easily soldered even after prolonged storage.

The structure protects and preserves the solderability of the metal-coated glass fibers. Upon application of heat, the protective layer is vaporized and the solderability of the metallization of the glass fibers is enhanced. Thus, the fiber can be easily soldered to other solderable surfaces particularly to many other fibers to form an integral hermetically joined cable.

EXAMPLES

Two lengths of copper-clad optical fiber were divided into 8 equal pieces to provide one data point for each of the parameter combinations listed below. The test results for the thin and thick samples of each type were averaged.
1) Cable thickness
  a) Thin (0.015 to 0.019 inch, or 0.038 to 0.048 cm, dia.)
  b) Thick (0.020 to 0.025 inch, or 0.051 to 0.064 cm, dia.)
2) Flux or coating used
  a) RMA (applied just before testing) (RMA is rosin mildly activated)
  b) NTC 1500-041088 (this invention) (NTC comprised cellulose acetate butyrate, comprising 2 to 3% acetyl and 50% butyryl, as determined by Fourier Transform Infrared Spectrometry; this material is no longer commercially available)
  c) 531-1 with adipic acid and IPA/acetone (this
invention) (531-1 comprised cellulose acetate butyrate having a high butyryl content (average of 50 percent) and a melting range of 135° to 150° C.; the ratio of 531-1 to fluxing agent was 1:1)
3) Storage conditions
  a) Fresh ("As Rec'd"); and
  b) 60 hours at 70° C. in a circulation oven without humidity controls ("Accel Age").

The solderability test data is presented in the Table below. In addition to the three flux coatings used above, a fourth condition was also studied: no flux applied to the metal coating. The time to cross buoyancy line was measured under the two conditions: fresh and after aging.

TABLE

| Solderability Test Data. | |
|---|---|
| | Zero Time (sec) |
| No Coating | |
| As Rec'd | >5.00 |
| Accel Age | 2.65 |
| RMA | |
| As Rec'd | 3.05 |
| Accel Age | 1.60 |
| NTC | |
| As Rec'd | 0.55 |
| Accel Age | 1.40 |
| 531-1 | |
| As Rec'd | 1.95 |
| Accel Age | >5.00 |

The zero time, expressed in seconds, indicates how long it took the part being submerged to a specific depth in the solder to achieve neutral buoyancy. In other words, the buoyancy of the immersed part has been overcome by wetting action between the molten solder and the submerged portion of the part. In addition, the solder surface is perpendicular to the surface of the part. Non-wetting occurs when the part remains buoyant in the solder and the angle between the part and the solder remains obtuse. Positive wetting occurs when an acute angle is formed between the part and the solder that contacts the part. Further, the buoyancy of the part has been completely overcome and the solder is actually pulling down on the part. The smaller the zero time number, the more solderable the part.

In the case of the results shown in the Table, a set of common parts was used, so the results indicate relative capabilities of the fluxes tested. The NTC formulation is the best performer; in both cases, it had the lowest zero time value. The data further show that the two versions of this invention (NTC and 531-1) are as good or better than RMA in achieving the same solderability level. In both cases, the advantages of protection against metal oxidation and contamination are added to the achievement of good solderability.

Thus, there has been disclosed a structure for protecting metal-clad glass fibers during storage and for enhancing solderability. It will be readily apparent to those skilled in this art that various changes and modifications of an obvious nature may be made, and all such changes and modifications are deemed to fall within the scope of the invention, as defined by the appended claims.

What is claimed is:

1. A glass fiber structure adapted for forming a solder connection comprising:
   a) a glass fiber;
   b) a metallic layer surrounding said glass fiber; and
   c) a protective layer coating the entirety of said metallic layer, said protective layer comprising a mixture of a dicarboxylic acid fluxing agent and a chose protective material which is unreactive with said dicarboxylic acid and which forms a film with said dicarboxylic acid that alters at a chosen soldering temperature to release said dicarboxylic acid, wherein, prior to exposure to said soldering temperature, said chosen protective material maintains said metallic layer in an oxide-free state and said protective layer protects aid metallic layer from external contamination to thereby enhance the solderability of said metallic layer when exposed to said soldering temperature at which said fluxing agent is released.

2. The structure of claim 1 wherein said dicarboxylic acid fluxing agent is selected from the group consisting of adipic acid, succinic acid, fumaric acid, maleic acid, glutaric acid, their alkyl derivatives and their aromatic derivatives.

3. The structure of claim 1 wherein said chosen protective material is selected from the group consisting of a cellulose derivative, a vinyl chloride, copolymer, an acrylic copolymer, a polyether glycol, and a thermoplastic elastomer.

4. The structure of claim 3 wherein said cellulose derivative is selected from the group consisting of cellulose cellulose acetate, cellulose nitrate, cellulose acetate butyrate, cellulose acetate propionate, and a cellulose ether.

5. The structure of claim 1 wherein said protective material comprises cellulose acetate butyrate and said fluxing agent comprises adipic acid.

6. The structure of claim 5 wherein the relative ratio by weight of said cellulose acetate butyrate to said adipic acid is about 1:1.

7. The structure of claim 1 wherein said glass fiber comprises an optical fiber comprising:
   (a) a core having a first refractive index; and
   (b) a clad surrounding said core and having a second refractive index.

8. The structure of claim 1 wherein said glass fiber comprises a capillary.

* * * * *